(12) United States Patent
Asakawa

(10) Patent No.: US 6,488,096 B1
(45) Date of Patent: Dec. 3, 2002

(54) HOOF PAD

(76) Inventor: Nobumasa Asakawa, 5-20-2 Tamachi, Shizuoka-shi, Shizuoka-ken (JP)

( * ) Notice: Subject to any disclaimer, the term of this patent is extended or adjusted under 35 U.S.C. 154(b) by 0 days.

(21) Appl. No.: 09/614,000

(22) Filed: Jul. 11, 2000

(30) Foreign Application Priority Data

Feb. 3, 2000 (JP) .................................... 2000-026158

(51) Int. Cl.⁷ ............................................... A01L 7/02
(52) U.S. Cl. ............................ 168/26; 168/1; 168/2; 168/14; 168/27
(58) Field of Search .................... 168/1, 2, 14, 12, 168/24, 26, 28, 27

(56) References Cited

U.S. PATENT DOCUMENTS

| | | | | |
|---|---|---|---|---|
| 252,251 A | * | 1/1882 | Raymond | |
| 3,999,611 A | * | 12/1976 | Bucalo | 168/4 |
| 4,420,046 A | * | 12/1983 | Choplin | 168/14 |
| 4,765,412 A | * | 8/1988 | Colonel et al. | 168/15 |
| 5,289,878 A | * | 3/1994 | Landi et al. | 168/14 |
| 5,303,777 A | * | 4/1994 | Zook | 168/12 |

\* cited by examiner

*Primary Examiner*—Yvonne R. Abbott
(74) *Attorney, Agent, or Firm*—Pitney, Hardin, Kipp & Szuch LLP

(57) ABSTRACT

A hoof pad is used with a shoe for an animal, with the pad having a plate-shaped object and a plurality of catches. The flexible plate-shaped object has a partially elliptical shape including a top surface, an inner edge, an outer edge substantially matching the inner edge of the shoe. The plurality of catches are formed on the top surface of the plate-shaped object, with the catches extending outward from the plate-shaped object. The plate-shaped object is supported on the inside of the shoe by securing the catches on the plate-shaped object to the top of the shoe so that the top of the plate-shaped object has substantially the same height as the top of the shoe. The plate-shaped object is removably attachable to be freely attached and removed from the bottom of the shoe.

6 Claims, 5 Drawing Sheets

HOOF PAD

COPYRIGHT NOTICE

A portion of the disclosure of this patent document contains material which is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

BACKGROUND OF THE INVENTION

The present invention relates to hoof pad, and in particular to a hoof pad which may be attached to a shoe, such as a horseshoe, in order to protect the bottom of an animal's hoof. A horseshoe or shoes and like apparatus for other animals is regularly attached to the bottom of a horse's hoof using nails. Hoof pads are known in the prior art, such as the hoof pad shown in FIG. 1. The hoof pad 1 of the prior art is a plate-shaped object having a partially elliptical shape and flexibility with the outer edge 1a substantially matching the outer edge 3a of the shoe, such as a horseshoe 3. The hoof pad 1 of the prior art is situated between the top surface 3b of the horseshoe 3 and the bottom of the hoof; i.e., the bottom surface 5a of the hoof 5. The horseshoe 3 is then attached to the hoof 5 using nails 7 that pass through both the horseshoe 3 and the hoof pad 1.

However, the following problems are associated with the hoof pad of the prior art. First, the hoof pad cannot be removed alone when the horseshoe is attached to the hoof with nails because the hoof pad of the prior art is attached to the hoof along with the horseshoe using nails. In other words, the nails attaching the horseshoe and the hoof pad to the hoof have to be removed and the horseshoe taken off along with the hoof pad when the hoof pad is to be removed. When a hoof pad is attached to a hoof, moreover, it has to be attached to the hoof along with the horseshoe using nails. Therefore, not anybody can attach and remove the hoof pad. This has to be done by a farrier or blacksmith.

In addition, the hoof pad is not easy to attach and remove, so hoof oil cannot be applied to the bottom of the hoof, and debris caught between the hoof pad and the bottom of the hoof such as sand and sawdust cannot be removed without taking off the hoof pad.

Furthermore, because the bottom of the hoof comes into contact with the hoof pad, the hoof tends to become soft because of the cushioning effect of the hoof pad and tends to then require a hoof pad.

Moreover, because the weight of the horse is brought to bear on the hoof pad and the hoof pad has a cushioning effect, the nails holding the horseshoe and the hoof pad to the bottom of the hoof tend to become loose.

In addition, because the hoof pad is situated between the bottom of the hoof and the horseshoe and has a fixed thickness, hoof pads have to be attached to a left and right pair of hooves at the same time so that the bottom of the hooves are a fixed height from the ground. In other words, if the hoof pad has to be replaced on the left hoof or the right hoof in a pair of hooves, the hoof pad on the other hoof in the pair also has to be replaced.

SUMMARY OF THE INVENTION

A hoof pad is disclosed which is attachable to a shoe, such as a horseshoe, in order to protect the bottom of an animal's hoof. The disclosed hoof pad solves the problems associated with hoof pads of the prior art, by providing a hoof pad that can be easily attached and removed while the horseshoe is attached to the hoof with nails. In the disclosed hoof pad, a plurality of catches is formed on top of a plate-shaped object having a partially elliptical shape and flexibility with the outer edge substantially matching the inner edge of the horseshoe, and the catches extend outward from the plate-shaped object, while the plate-shaped object is supported on the inside of the horseshoe by securing the catches on the plate-shaped object to the top of the horseshoe so that the top of the plate-shaped object has substantially the same height as the top of the horseshoe, and with the plate-shaped object capable of being freely attached and removed from the bottom of the horseshoe.

In the disclosed hoof pad, notches are formed in the top surface of the horseshoe in the sections corresponding to the catches in the hoof pad so as to receive the catches. In addition, the hoof pad has notches formed continuously on top of a horseshoe along the inner edge of the horseshoe, with a plate-shaped object having a partially elliptical shape and flexibility with the outer edge engaging the notches, and the plate-shaped object is supported on the inside of the horseshoe by securing the outer edge of the plate-shaped object to the notches so that the top of the plate-shaped object has substantially the same height as the top of the horseshoe, and with the plate-shaped object being freely attached and removed from the bottom of the horseshoe.

The hoof itself is nailed and fixed to the bottom of horseshoe in the same way as the prior art. The hoof pad, which is nailed with the horseshoe, can be freely attached and removed from the bottom of the horseshoe. Therefore, when hoof pad is attached with the horseshoe which is nailed with hoof, the plate-shaped object is supported on the inside of the horseshoe by securing the catches on the plate-shaped object to the top of the horseshoe when the horse's leg is above the ground. When the hoof pad is removed from the horseshoe which is nailed with hoof, the plate-shaped object of the hoof pad which is inside of the horseshoe is pulled toward the ground when horse leg is above the ground. The plate-shaped object has flexibility, and it can be freely attached and removed from the bottom of the horseshoe.

The notches are formed in the top surface of the horseshoe in the sections corresponding to the catches so as to receive the catches, so the notches and the catches can be easily received and removed. The notches are formed on top of a horseshoe along the inner edge of the horseshoe, with the plate-shaped object supported on the inside of the horseshoe by securing the outer edge of the plate-shaped object to the notches.

The disclosed hoof pad provides the following functions and advantages:

1. protects the bottom of the hoof;
2. prevents pressure on the bottom of the hoof by sawdust or manure.
3. prevents the hoof from drying out;
4. protects the hoof hygienically from manure;
5. protects the bottom of the hoof from crushed stone;
6. protects the bottom of the hoof from excessive wear;
7. protects the bottom of the hoof during outdoor horse riding;
8. holds medication in place on the bottom of the hoof in case of hoof disease; and
9. prevents snow from becoming packed in the bottom of the hoof.

DETAILED DESCRIPTION OF THE PREFERRED EMBODIMENT

Figure 1:
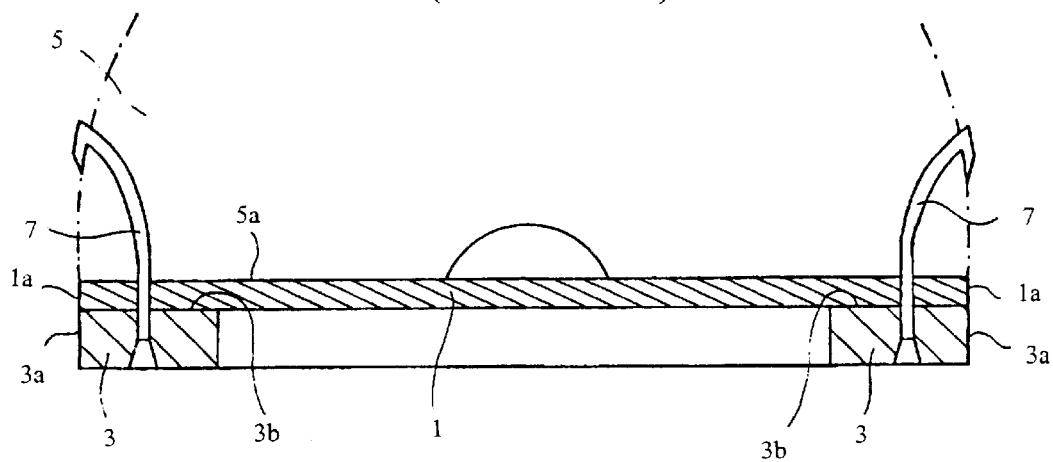
FIG. 1 illustrates a cross-sectional view of an attached hoof pad of the prior art.
Figure 2:
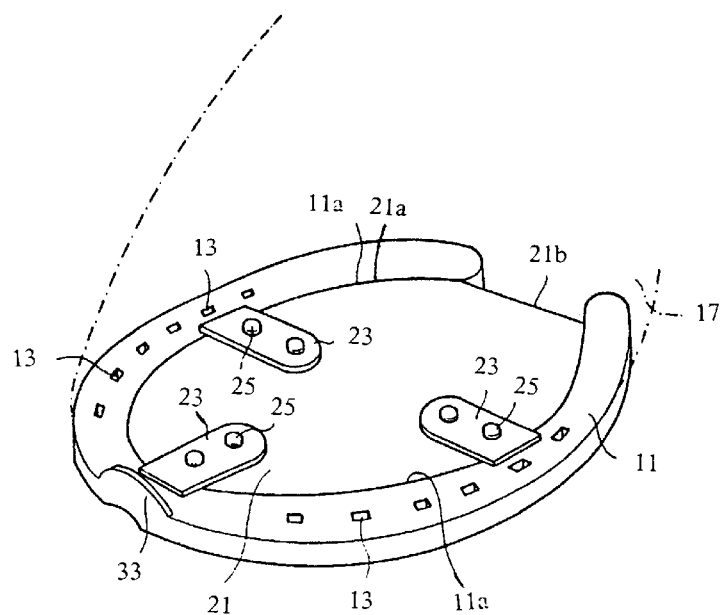
FIG. 2 illustrates a perspective view of the disclosed hoof pad attached to a hoof.
Figure 3:
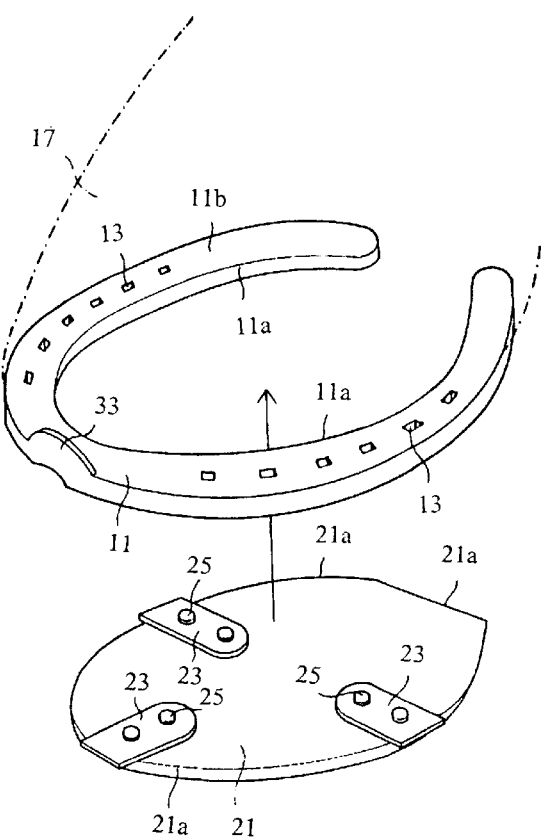
FIG. 3 illustrates a perspective view of the hoof and hoof pad of FIG. 2.
Figure 4:
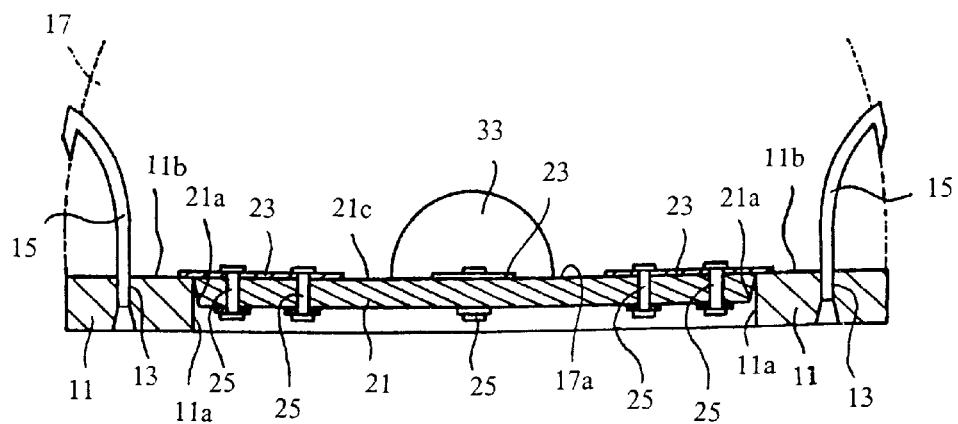
FIG. 4 illustrates a cross-sectional view of the attached hoof pad of FIG. 2.
Figure 5:
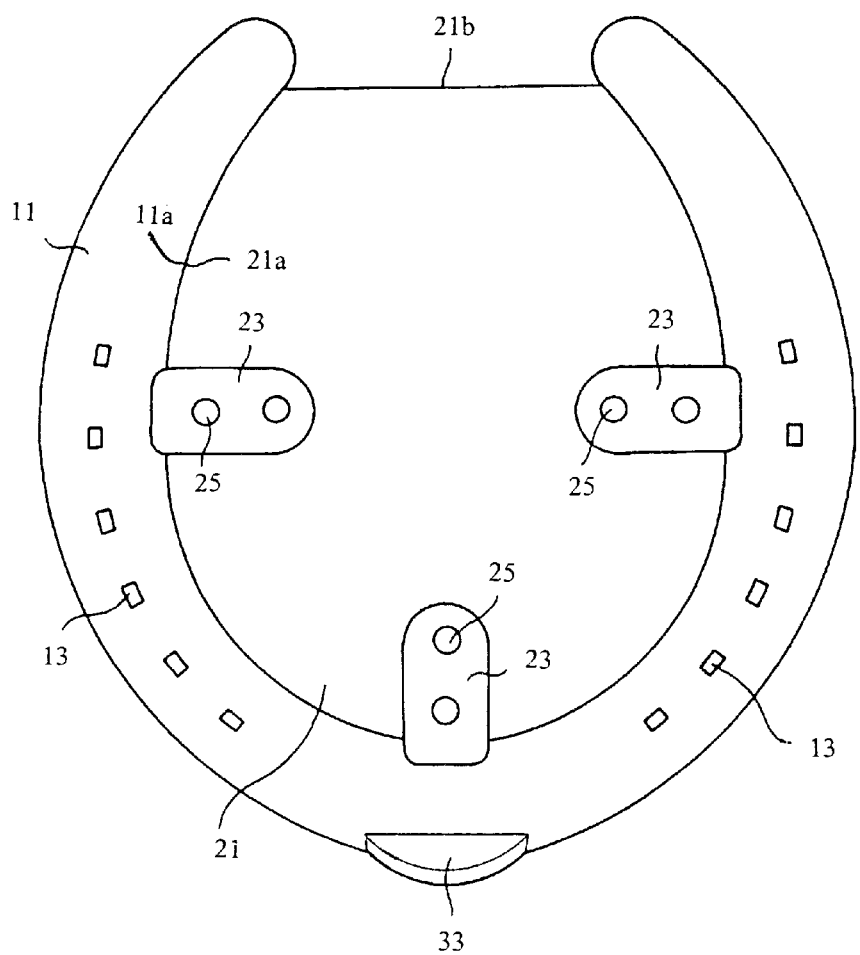
FIG. 5 illustrates a plan view of the attached hoof pad of FIG. 2.

Referring to FIGS. 2–9, a pad or apparatus is disclosed for use on the extremity of an animal, such as the hoof of an animal. The animal may be a horse, and the pad or apparatus may be used in conjunction with a horseshoe. However, the animal may be any animal which may wear a shoe or comparable apparatus on the extremity of the animal. As described in the example embodiments herein, the examples of a horse and shoes for use on horses' hooves are used to illustrate the disclosed pad or apparatus. Accordingly, it is understood that the description of horses and horseshoes does not limit the application of the disclosed pad or apparatus.

As shown in FIGS. 2–5, the horseshoe 11 may be the same as in the prior art. A plurality of holes 13 pass through the horseshoe 11 from top to bottom. Nails 15 are passed through the holes 13 in the horseshoe 11 from the bottom when the horseshoe 11 is on the bottom of the horse's hoof 17a, and the horseshoe 11 is secured to the bottom of the hoof 17a by hammering the nails 15 into the hoof 17.

In the example embodiment shown in FIGS. 2–5, a plate-shaped hoof pad 21 is flexible and partially elliptical with the outer edge 21a substantially matching the inner edge 11a of the horseshoe and a notch in the rear 21b. The plate-shaped object 21 is made, for example, from a synthetic resin, such as urethane resin. A plurality of catches 23 extend outward from the plate-shaped object 21 on the top 21c of the plate-shaped object 21. The number and position of these catches 23 are optional. A pin-like element 25 is used to attach the catches 23 to the plate-shaped object 21. The plate-shaped object 21 is supported on the inside of the horseshoe 11 by securing the catches 23 on the plate-shaped object 21 to the top 11b of the horseshoe 11 so that the top 21c of the plate-shaped object 21 has substantially the same height as the top 11b of the horseshoe 11, and the plate-shaped object 21 can be freely attached and removed from the bottom of the horseshoe 11.

Figure 6:
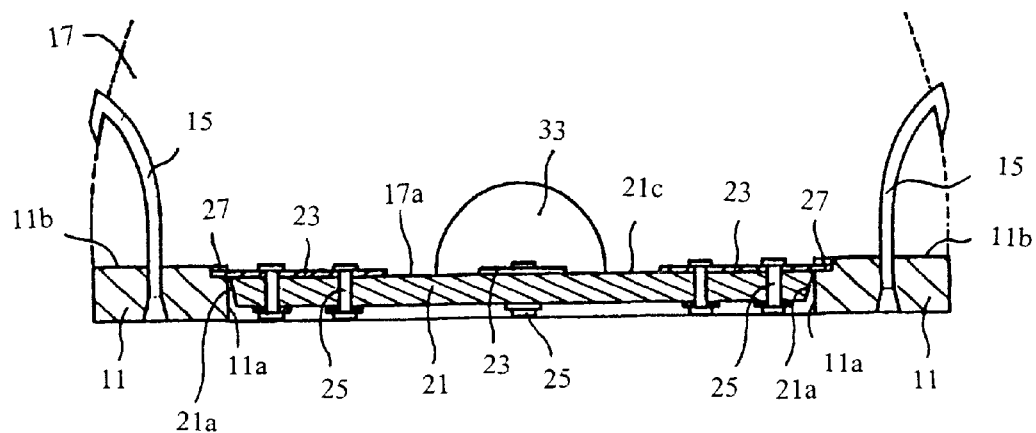
FIG. 6 illustrates a cross-sectional view of another embodiment of the attached hoof pad.
Figure 7:
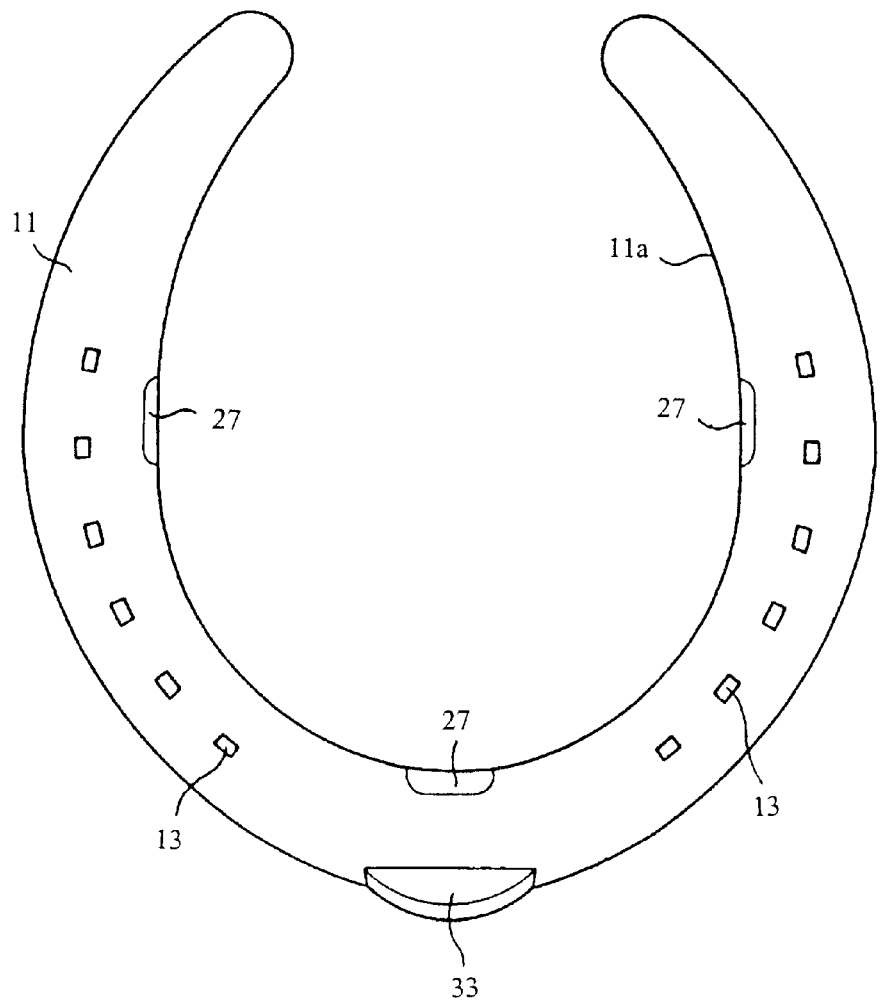
FIG. 7 illustrates a plan view of the hoof pad of FIG. 6.

In another example embodiment shown in FIGS. 6–7, notches 27 are formed in the top surface 11b of the horseshoe 11 in the sections corresponding to the catches 23 so as to receive the catches 23.

Figure 8:
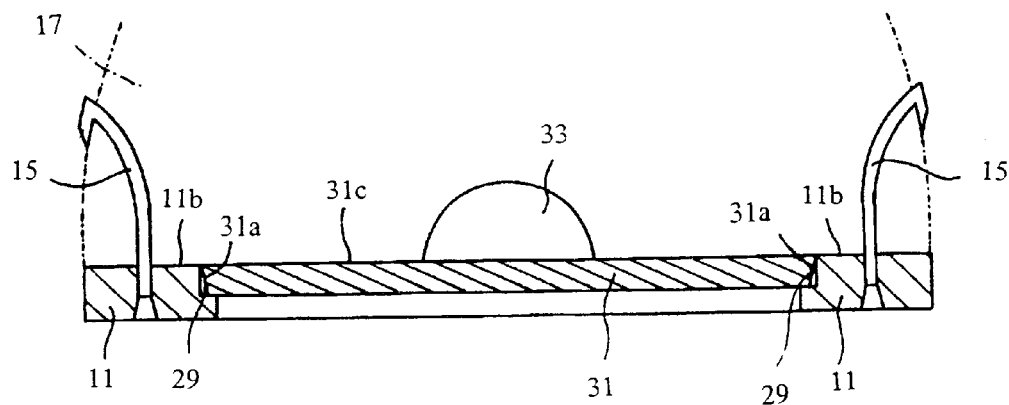
FIG. 8 illustrates a cross-sectional view of a further embodiment of an attached hoof pad.
Figure 9:
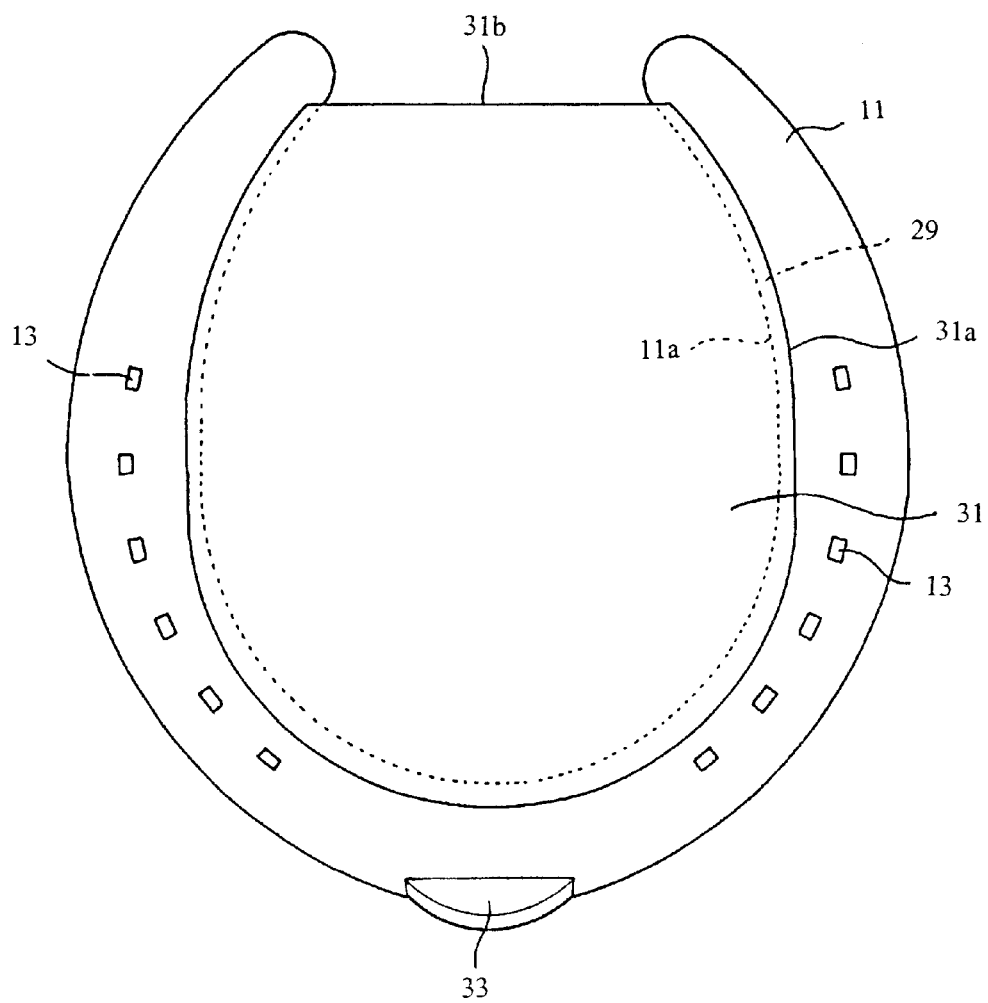
FIG. 9 illustrates a plan view of the attached hoof pad of FIG. 8.

In a further example embodiment shown in FIGS. 8–9, notch stages 29 are formed continuously on top 11b of a horseshoe 11 along the inner edge 11a of the horseshoe 11, which acts as a shelf or ridge upon which the outer edge 31a is disposed. A plate-shaped object 31 is provided and is flexible, for example, being made from a synthetic resin such as a urethane resin. The plate-shaped object 31 is partially elliptical and notched in the rear 31b with the outer edge 31a engaging the notches 29. The plate-shaped object 31 is supported on the inside of the horseshoe 11 by securing the outer edge 31a of the plate-shaped object 31 to the notches 29 so that the top 31c of the plate-shaped object 31 is substantially the same height as the top 11b of the horseshoe 11, and the plate-shaped object 31 can be freely attached and removed from the bottom of the horseshoe 11. A protrusion 33 extends upwards from the head of the horseshoe 11.

The hoof pads and apparatus described in conjunction with FIGS. 2–9 have the following superior effects and advantages, compared to the prior art hoof pad shown in FIG. 1:

1. Because the hoof pad is not interposed between the horseshoe and the bottom of the hoof, the hoof pad can be easily attached and removed while the horseshoe is attached to the hoof with nails. In other words, the horseshoe does not have to be removed.

2. Because the nails do not have to be removed and replaced when a hoof pad is attached or removed, there is less chance of damage to the walls of the hoof.

3. Because the hoof pad is not interposed between the horseshoe and the bottom of the hoof, the hoof pad does not bear the weight of the horse. As a result, the hoof pad lasts longer.

4. Because the hoof pad is so easily attached and removed, it can be used when needed and removed when not needed.

5. Because the hoof pad is easy to attach and remove, hoof oil can be applied to the bottom of the hoof and debris caught between the hoof pad and the bottom of the hoof such as sand and sawdust can be removed when necessary.

6. Because the hoof pad is supported in the inside of the horseshoe so that the top of the plate-shaped object is substantially the same as the height of the top of the horseshoe and the height of the bottom of the hoof from the ground is unaffected, a hoof pad only has to be attached to the hoof that needs a hoof pad. In other words, a hoof pad can be attached safely to either the left or right hoof when needed without having to replace the hoof pad on the other hoof in the pair.

The effects and advantages of the disclosed pad or apparatus may be increased even more when a known anti-bacterial agent and/or antiseptic agent is added/deposited onto the hoof pad adjacent to the hoof 17. Furthermore, the hoof pad may be composed of known materials such as rubber, plastic, urethane, and other substances. In addition, the hoof pad may be provided in a kit with the shoe and/or the anti-bacterial/antiseptic agent.

The disclosed hoof pad has been described by way of the preferred embodiment. However, numerous modifications and substitutions may be made without departing from the spirit of the invention. Accordingly, the invention has been described by way of illustration rather than limitation.

REFERENCE NUMERALS

1 Hoof Pad
1a Outer Edge
3 Horseshoe
3a Outer Edge

3b Top Surface
5 Hoof
5a Bottom Surface
11 Horseshoe
11a Inner Edge
11b Top Surface
13 Nail Hole
15 Nail
17 Hoof
17a Bottom of Hoof
21 Plate-Shaped Object
21a Outer Edge
21b Rear
21c Top Surface
23 Catch
25 Pin-Like Element
27 Notch
29 Notch Stage
31 Plate-Shaped Object
31a Outer Edge
31b Rear
31c Top Surface
33 Protrusion

What is claimed is:

1. A pad for use with a shoe for an animal, the pad comprising:
   a flexible plate-shaped object of flexible material having a partially elliptical shape including:
   a top surface;
   an outer edge substantially matching an inner edge of the shoe; and
   a plurality of catches formed and fixed with a fixing element on the top surface of the plate-shaped object, wherein the catches extend outward from the outer edge of the plate-shaped object;
   wherein the plate-shaped object is supported on the inside of the shoe by fastening the catches on the plate-shaped object to the top of the shoe so that the top of the plate-shaped object has substantially the same height as the top of the shoe;
   wherein all elements and components, including the catches and the fixing elements, for attachment or fixture of the pad on the shoe are provided and seated on the pad side, and no attachment or fixture is provided on the shoe side, and
   wherein the plate-shaped object is removably attachable to be freely attached and removed from the bottom of the shoe.

2. The pad according to claim 1, wherein the shoe is a horseshoe.

3. The pad according to claim 1, further comprising:
   an anti-bacterial/antiseptic agent disposed on the plate-shaped object.

4. An apparatus for an extremity of an animal, the apparatus comprising;
   a shoe to be positioned on the extremity of the animal; and
   a pad having:
   a flexible plate-shaped object of flexible material having a partially elliptical shape including:
   a top surface;
   an outer edge substantially matching an inner edge of the shoe; and
   a plurality of catches formed and fixed with a fixing element on the top surface of the plate-shaped object, wherein the catches extend outward from the outer edge of the plate-shaped object,
   wherein the plate-shaped object is supported on the inside of the shoe by fastening the catches on the plate-shaped object to the top of the shoe so that the top of the plate-shaped object has substantially the same height as the top of the shoe;
   wherein all elements and components, including the catches and the fixing elements, for attachment or fixture of the pad on the shoe are provided and seated on the pad side, and no attachment or fixture is provided on the shoe side, and
   wherein the plate-shaped object is removably attachable to be freely attached and removed from the bottom of the shoe.

5. The apparatus according to claim 4, wherein the shoe is a horseshoe.

6. The apparatus according to claim 4, further comprising:
   an anti-bacterial/antiseptic agent disposed on the plate-shaped object.

* * * * *